United States Patent [19]
Smorodinsky et al.

[11] Patent Number: 5,884,290
[45] Date of Patent: Mar. 16, 1999

[54] METHOD OF TRANSFERRING FUNDS EMPLOYING A THREE-NODE REAL-TIME ELECTRONIC INTERLOCK

[75] Inventors: Lev Smorodinsky, Laguna Hills; Joseph Craig McSweeney, Trabuco Canyon; James Walter Thompson, Mission Viejo, all of Calif.

[73] Assignee: Unisys Corporation, Blue Bell, Pa.

[21] Appl. No.: 735,145

[22] Filed: Oct. 22, 1996

[51] Int. Cl.[6] .................................................. G06F 17/60
[52] U.S. Cl. .............................. 705/44; 705/39; 705/40; 705/45; 380/24; 235/379
[58] Field of Search .................................. 705/39, 40, 44, 705/45; 235/379; 380/24; 379/91.01

[56] References Cited

U.S. PATENT DOCUMENTS

| | | | |
|---|---|---|---|
| 5,453,601 | 9/1995 | Rosen ........................................ | 380/24 |
| 5,504,677 | 4/1996 | Pollin ........................................ | 705/45 |
| 5,649,117 | 7/1997 | Landry ...................................... | 705/40 |
| 5,652,786 | 7/1997 | Rogers ................................. | 379/91.01 |
| 5,659,165 | 8/1997 | Jennings et al. ........................ | 235/379 |
| 5,677,955 | 10/1997 | Doggett et al. ......................... | 380/24 |
| 5,703,344 | 12/1997 | Bezy et al. .............................. | 235/379 |
| 5,745,886 | 4/1998 | Rosen ........................................ | 705/39 |
| 5,799,087 | 8/1998 | Rosen ........................................ | 380/24 |

*Primary Examiner*—Allen R. MacDonald
*Assistant Examiner*—M. Irshadullah
*Attorney, Agent, or Firm*—Charles J. Fassbender; Mark T. Starr; Steven R. Petersen

[57] ABSTRACT

A method of transferring funds electronically, is performed by a group of N computers X(1) thru X(N) which are intercoupled to each other, and to another computer Y, by a communication channel. Each computer of the group includes multiple customer accounts, and the computer Y includes a net account for each computer of the group. To initiate the transfer of funds between two customer accounts, a customer sends an input request to one of computers X(i) of the group; and this input request specifies that funds F(z) be transferred in a particular direction between a customer account A(r) in computer X(i) and a customer account A(s) in another computer X(j) of the group. For each input request that is received by computer X(i), a respective sequence of electronic control messages is sent on the communication channel among the computers X(i), X(j) and Y. By this sequence of control messages, computer X(i) tests the status of customer account A(r); computer X(j) tests the status of customer account A(s); and computer Y tests the status of the net accounts for computers X(i) and X(j). If all of the tests by the computers X(i) and x(j) are satisfied, then those computers both authorize computer Y to transfer the funds F(z) between the net accounts for computers X(i) and X(j); and if all of the tests by computer Y are satisfied, then computer Y authorizes the computers X(i) and X(j) to transfer the funds F(z) between the customer accounts A(r) and A(s). This authorization from all three computers eliminates the need to reverse a transfer of funds; and consequently, the transferred funds are available for withdrawal immediately after the sequence of messages is completed successfully.

25 Claims, 5 Drawing Sheets

METHOD OF TRANSFERRING FUNDS EMPLOYING A THREE-NODE REAL-TIME ELECTRONIC INTERLOCK

BACKGROUND OF THE INVENTION

This invention relates to methods of transferring funds electronically between customer accounts which are stored in a network of computers.

One prior art method of transferring funds is disclosed in FIG. 1 of U.S. Pat. No. 5,465,206 (hereinafter the Visa patent). In this prior art method, a customer receives a bill from a biller; and in response, the customer mails a check back to the biller. This check is then presented by the biller to the biller's bank for payment. Then the biller's bank sends the check to a settlement bank which clears and settles the transfer of funds between the biller's bank and the customer's bank. Following this settlement step, funds are transferred by the biller's bank to the biller's account where it is available for withdrawal. However, this method of transferring funds is inherently limited in speed by the steps which require that a check be physically moved from the customer to the biller, then from the biller to the biller's bank, and then from the biller's bank to the settlement bank.

In a second prior art method of transferring funds (which is disclosed in FIG. 2 of the Visa patent), a customer responds to a bill from a biller by electronically sending a message to a service bureau, and this electronic message authorizes the service bureau to pay the bill. Upon receipt of the message, the service bureau writes a check on the customer's account in the customer's bank and presents that check to the service bureau's bank for payment. Then, the service bureau's bank sends the check to a settlement bank which clears and settles the transfer of funds between the service bureau's bank and the customer's bank. This sequence of steps is repeated many times for many customers of the biller. Thereafter, the service bureau sends the biller a list of all of the bills that were paid along with a single check for the total amount paid. With this method of transferring funds, the need for the customers to write and mail checks is eliminated. However, this method of transferring funds is still inherently slow because before the biller is paid, checks must be physically moved from the service bureau to the service bureau's bank, and then from there to a settlement bank where the checks are settled with each customer's bank.

In a third prior art method of transferring funds (which is disclosed in FIG. 3 of the Visa patent), a biller obtains regular periodic payments from a customer's account in a customer's bank with those payments being initiated by the biller, rather than the customer. With this method, the biller maintains a file which identifies the customer, the amount of the periodic payment, and the date on which each payment is due. To initiate each payment, the biller electronically sends a request for payment to the biller's bank; and in response, the biller's bank generates a debit request in a certain standard format, which is required by an automated clearing house (ACH). This debit request is then stored in the biller's bank, along with all other ACH debit and credit requests which the biller's bank generates for other customers. Thereafter, a batch of ACH debit and credit requests are electronically transmitted to the Federal Reserve or other ACH clearing institution; and by this transmission, net accounts between the biller's bank and the customer's bank are settled. With this method of transferring funds, the need to physically move checks from one location to another is eliminated. However, this method of transferring funds is still inherently slow due to a limitation that ACH debit and credit requests must be transmitted to the Federal Reserve or other ACH clearing institution at least one day before the biller's account in the biller's bank can be credited. See for example, page 105 of "The Federal Reserve System Purposes & Functions" by the Board of Governors of the Federal Reserve System, Washington, D.C., 1994.

In a fourth prior art method of transferring funds (the Visa method) which is disclosed in FIGS. 4–12 of the Visa patent, the biller's bank, the customer's bank, and a settlement bank are all intercoupled by an electronic payment network. With this method, a customer responds to a bill from a biller by ordering the customer's bank to pay the bill. In response, the customer's bank examines the customer's account to determine if sufficient funds are available to pay the bill or determine that the customer's bank is willing to take the risk of loss if funds are not available. If either determination is made, the customer's bank electronically sends a payment message through the payment network to the biller's bank. Each such payment message is also stored in the payment network where it is acted upon by a settlement subsystem which nets the funds that are being transferred by all payment messages between the customer's bank and the biller's bank. Thereafter, the settlement subsystem electronically sends a transfer order to the settlement bank which settles the net accounts between the customer's bank and the biller's bank. By this settlement step, funds are transferred by the biller's bank to the biller's account. With this method of transferring funds, the need to physically move checks from one location to another is eliminated.

However, a problem with the Visa method of transferring funds is that the payment messages are sent to the biller's bank without first examining the status of the biller's account in the biller's bank and examining the status of the net accounts in the settlement subsystem. Consequently, payment messages are received in the biller's bank and the settlement subsystem even when they should not be sent. This occurs, for example, when the biller's account has been closed, and when the net account of the customer's bank is too low to permit funds to be transferred. In the Visa method, there is no feedback of electronic control messages from the biller's bank and the settlement subsystem to the customer's bank. Thus, it is not possible for the customer's bank to a) notify the biller's bank and the settlement subsystem of a request to transfer funds, and subsequently, b) transfer the funds only if authorization to proceed is given by the biller's bank and the settlement subsystem. Consequently, with the Visa method, the need to reverse the transfer of funds occurs.

In an attempt to reduce the need to reverse a payment message, each customer bank stores a copy of a universal biller reference file (UBF) which contains information about each biller's account. However, this does not eliminate the need to reverse a payment message because the copied UBF files become out of date as soon as the status of a biller's account changes. Further, the copied UBF files multiply the total storage that is needed by the total number of banks. In addition, the copied UBF files say nothing about the status of the net accounts for each bank.

Accordingly, a primary object of the invention is to provide an improved method of transferring funds wherein all of the above problems are eliminated.

BRIEF SUMMARY OF THE INVENTION

With the present invention, a method of transferring funds electronically is performed by a group of N computers X(1) thru X(N) which are intercoupled to each other, and to another computer Y, by a communication channel. Each of these computers X(1), X(N) and Y is physically located at a respective financial institution such as a bank, or a savings and loan, or a credit union. Each computer of the group includes multiple customer accounts, and the computer Y includes a net account for each computer of the group.

To initiate the transfer of funds between two customer accounts, a customer sends an input request to one of computers X(i) of the group; and this input request specifies that funds F(z) be transferred in a particular direction between a customer account A(r) in computer X(i) and a customer account A(s) in another computer X(j) of the group. Here, indices i and j, r and s, and z respectively identify particular computers, accounts, and funds. Multiple customers can each send an input request at the same time.

For each input request that is received by computer X(i), a respective sequence of electronic control messages is sent on the communication channel among the computers X(i), X(j) and Y. By this sequence of control messages, computer X(i) tests the status of customer account A(r); computer X(j) tests the status of customer account A(s); and computer Y tests the status of the net accounts for computers X(i) and X(j).

If all of the tests by the computers X(i) and X(j) are satisfied, then those computers both authorize computer Y to transfer funds F(z) between the net accounts for computers X(i) and X(j); and if all of the tests by computer Y are satisfied, then computer Y authorizes the computers X(i) and X(j) to transfer funds F(z) between the customer accounts A(r) and A(s). This constitutes a three-node real-time electronic interlock of the customer accounts.

One particular feature of the present invention is that the transfer of funds between the customer accounts A(r) and A(s) occurs only after the status of the customer accounts have been fully tested by both computers X(i) and X(j), and only after the status of the net accounts for the computers X(i) and X(j) have been fully tested by computer Y. This testing occurs as part of the sequence by which the control messages are sent. Consequently, the need to reverse a transfer of funds is eliminated.

Another feature which is achieved by the present invention is the speed at which the transfer of funds is completed between the customer accounts A(r) and A(s). Each sequence of electronic control messages occurs in just a few seconds; and, the transferred funds are available for withdrawal immediately after the sequence of messages is completed successfully because at that point in time, all tests on the accounts are complete.

Still another feature of the present invention is that each of the computers X(1) through X(N) do not have to store a copy of a universal biller reference file which contains information about every biller's account. Consequently, the total amount of storage capacity that is required is minimized. Also, all tests on each account are performed by the computer where the account is stored; and thus, all tests are performed on the most current data.

Yet another feature of the present invention is that funds can be transferred in two different directions. Specifically, funds can be pushed from customer account A(r) to customer account A(s), or pulled from customer account A(s) to customer account A(r). Also with the present invention, these two operations are symmetrical and are performed by the same sequence of control messages.

DETAILED DESCRIPTION

Figure 1:
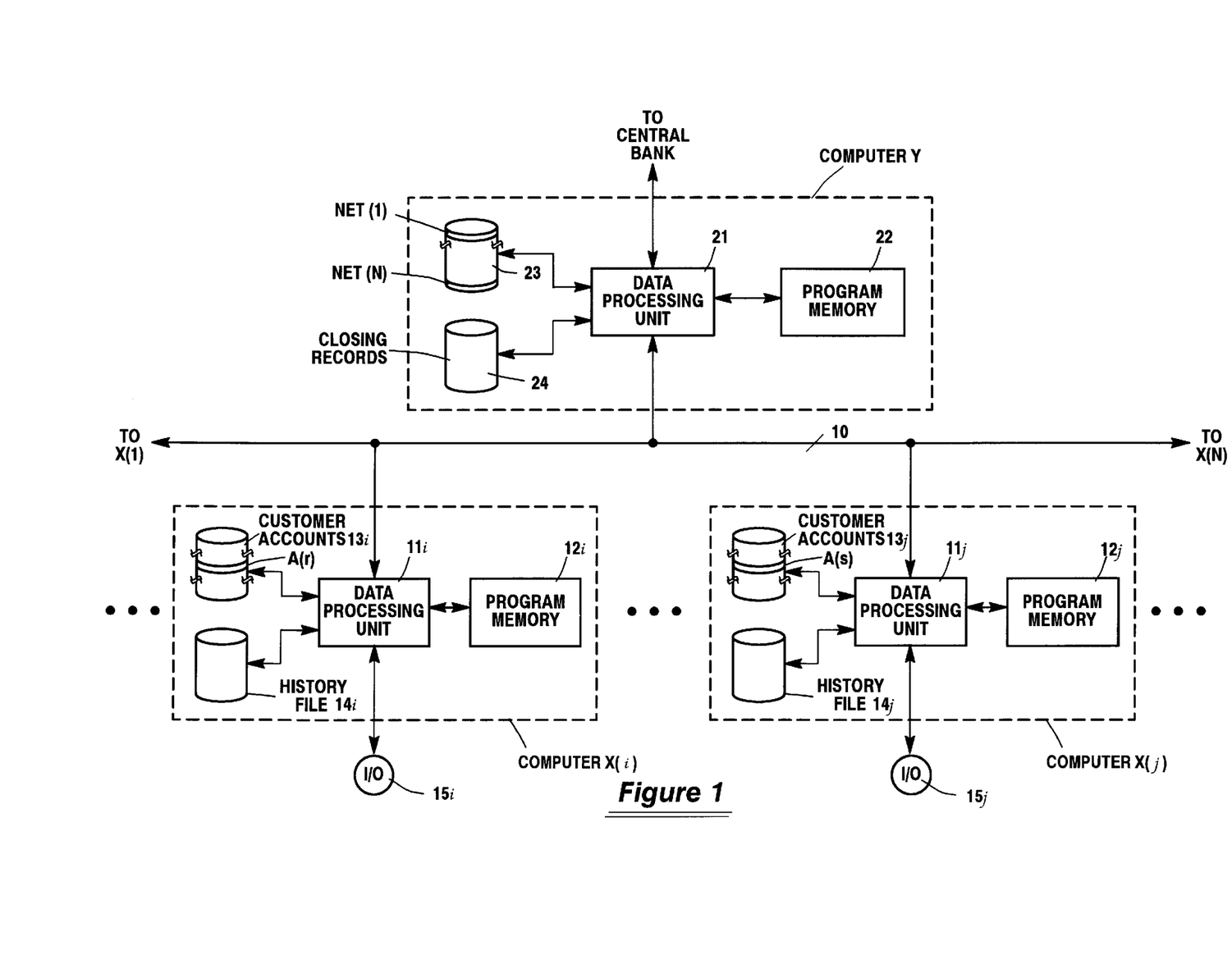
FIG. 1 shows a group of N computers X(1) through X(N) which are intercoupled to each other and to another computer Y, which operate together to transfer funds electronically in accordance with the present invention.

In FIG. 1, a group of N computers X(1) thru X(N) are intercoupled to each other and to another computer Y by a communication channel 10. All of the computers in the group of N have similar internal structures. Thus to simplify FIG. 1, only two computers X(i) and x(j) in the group of N are shown; and the remaining computers in the group are indicated by sets of three dots. Each of these computers X(i), X(j), and Y is physically located at a respective financial institution such as a bank, or a savings and loan, or a credit union.

Included within computer x(i) is a data processing unit 11i, a program memory 12i, a set of customer accounts 13i, and a history file 14i. Likewise, included within computer X(j) is a data processing unit 11j, a program memory 12j, a set of customer accounts 13j, and a history file 14j. Similarly, included within computer Y is a data processing unit 21, a program memory 22, a set of net accounts 23, and closing records 24.

Each of the data processing units 11i, 11j, and 21 can be implemented as any type of microprocessor chip which receives and executes programmable instructions. For example, unit 11i can be an Intel 486 chip; unit 11j can be a Motorola 68000 chip; and unit 21 can be a Pentium P6 chip.

Instructions for data processing units 11i, 11j, and 21 are stored respectively in the program memories 12i, 12j, and 22. By executing these instructions, a sequence of steps is performed whereby funds are transferred, in accordance with the present invention, between any two customer accounts. Three preferred sequences are described in detail herein in conjunction with FIGS. 2, 4 and 5.

A representative customer account which is included within computer X(i) is identified in FIG. 1 as account A(r). Similarly, another representative account within computer X(j) is identified in FIG. 1 as A(s). Each customer account A(r) and A(s) has an internal structure which is shown below in TABLE I.

TABLE I
Customer Accounts A(r) and A(s)
1) Account Owner
2) Amount of funds in Account
3) Active/Closed
4) Locked/Unlocked
5) ID of Account Authorized to Pull funds 5A) Limit on Pull Amount 5B) Limit on Pull Time/Frequency Item 1 in Table I identifies the owner of the account. Item 2 in Table I states the total amount of funds in the account. Item 3 in Table I is a status entry which indicates whether the account is active or closed. Item 4 in Table I is a status entry which indicates whether the account is locked or unlocked. Item 5 of Table I is an optional entry which, if it is present, identifies another customer account which has authority to pull funds from the present account. Item 5A sets a limit on the amount of funds which can be pulled from the present account in a single transaction; and item 5B sets a limit on the time and/or frequency with which funds can be pulled.

Each of the computers $X(i)$ and $X(j)$ can include any desired number of customer accounts. By comparison, computer Y includes a single net account for each of the computers $X(1)$ through $X(N)$. Each net account in the computer Y has an internal structure which is shown below in Table II.

TABLE II

Net Accounts

1) Account Owner

2) Net of Funds Transferred

3) Limit on Negative Net

4) Limit on Debit per Transaction

Item 1 in Table II identifies one of the computers $X(1)$ through $X(N)$ and a corresponding financial institution as the owner of the account. Item 2 in Table II states the net amount of funds which have been transferred by the computer that is identified in item 1. Item 3 in Table II sets a limit on the amount by which the net of the funds transferred can be negative. Item 4 in Table II sets a limit on the amount by which a net of the funds can be decreased by a single transaction.

Coupled to each of the computers $X(i)$ an $X(j)$ are respective input/output terminals (I/O terminals) $15i$ and $15j$. Each I/O terminal includes a keyboard whereby customers generate input requests to the computers $X(i)$ and $X(j)$ which initiate the transfer of funds between the customer accounts. Each I/O terminal also includes a visual display whereby customers are informed with messages from the computers $X(i)$ and $X(j)$ about whether funds were transferred as requested or whether the transaction was rejected.

Figure 2:
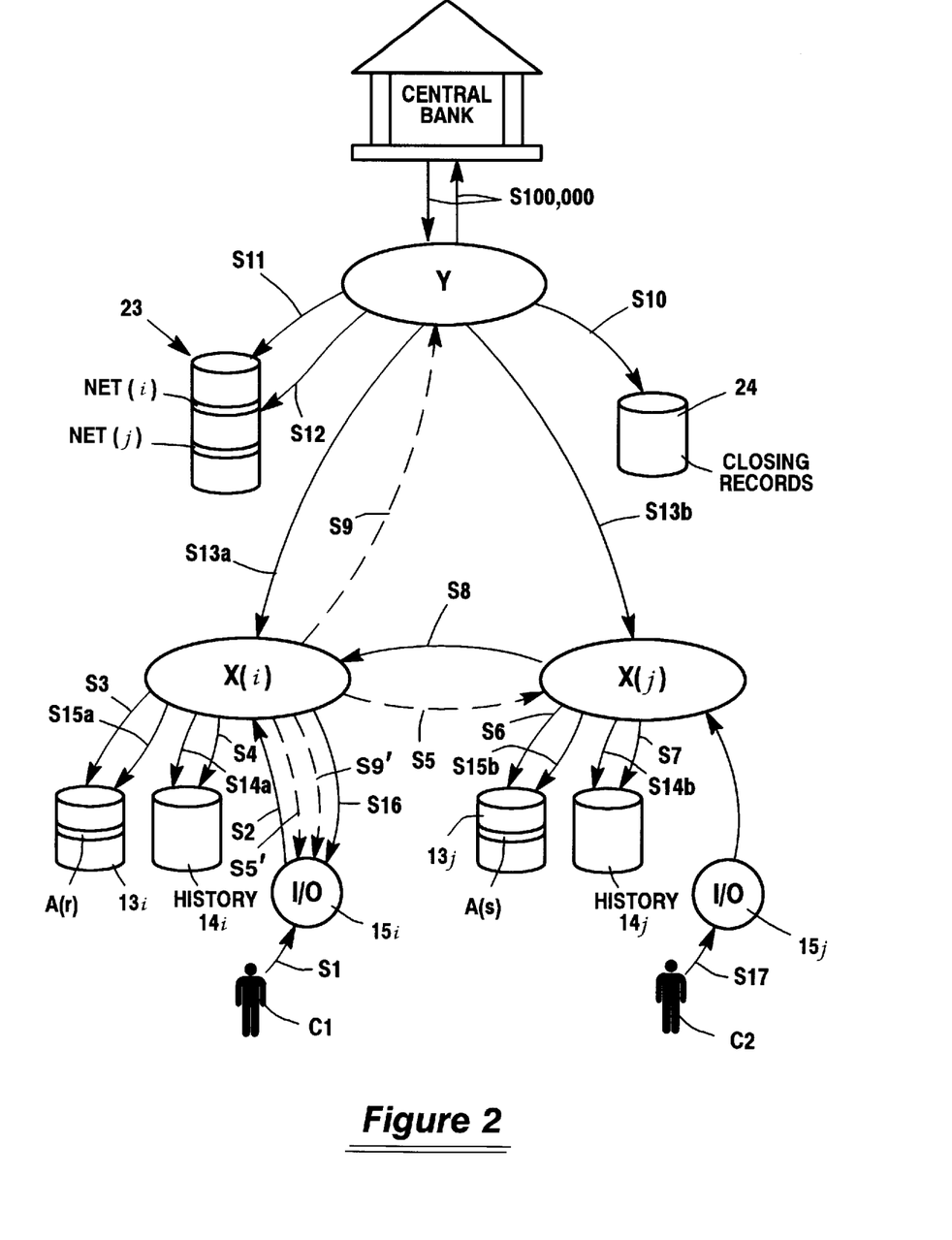
FIG. 2 shows a sequence of steps which are performed by the computers of FIG. 1 and which constitutes one preferred method of transferring funds electronically according to the present invention.

Turning now to FIG. 2, it shows one preferred sequence of steps which are performed by the computers of FIG. 1 when funds are transferred electronically in accordance with the present invention. These steps are identified in FIG. 2 as steps S1, S2, S3, S4, S5, S5', S6, S7, S8, S9, S9', S10, S11, S12, S13a, S14a, S15a, S16, S13b, S14b, S15b, S17 and S100,000. Each of these steps is described below.

In step S1, customer C1 uses the keyboard on the I/O terminal $15i$ to create an input request for computer $X(i)$ which specifies that funds $F(z)$ be transferred between the account $A(r)$, that is owned by customer C1, and another account $A(s)$ in computer $X(j)$. By this request, the direction in which the funds are to be transferred is specified as being from account $A(r)$ to account $A(s)$, or vice-versa.

In step S2, customer C1 causes the I/O terminal $15i$ to send the input request that was created in step S1 to the computer $X(i)$. This is achieved, for example, by pushing a transmit key on the I/O terminal $15i$.

In step S3, computer $X(i)$ responds to the input request which was sent in step S2 by testing the customer account $A(r)$. First, computer $X(i)$ searches the customer accounts $13i$ to determine if account $A(r)$ exists. If account $A(r)$ is not found, a branch is taken to step S5'.

Then computer $X(i)$ examines account $A(r)$ to determine if the account is locked or unlocked. If the account is locked, computer $X(i)$ defers further processing of the input request until the account subsequently becomes unlocked.

If the account $A(r)$ is unlocked, then computer $X(i)$ locks the account and proceeds by testing the account $A(r)$ to determine if it is active or closed. If the account is closed, a branch is taken to step S5'.

If the account is active, computer $X(i)$ tests the input message to determine the direction in which the funds $F(z)$ are to be transferred. When funds are to be transferred out of the account $A(r)$, computer $X(i)$ tests the account to see if it holds sufficient funds to cover the transfer. If insufficient funds are found, then a branch is taken to step S5'.

In step S5', computer $X(i)$ unlocks the account $A(r)$ and sends a message to the I/O terminal $15i$ which identifies the type of problem that was detected. By comparison, if none of the above tests detect any problem, then steps S4 and S5 are performed.

In step S4, computer $X(i)$ stores the input request that it received during step S2 in the history file $14i$. Then, in step S5, computer $X(i)$ sends a control message to computer $X(j)$ which requests that the funds $F(z)$ be transferred in the particular direction between customer account $A(r)$ in computer $X(i)$ and customer account $A(s)$ in computer $X(j)$.

In step S6, computer $X(j)$ responds to the receipt of the control message which is sent in step S5 by testing the customer account $A(s)$. First, computer $X(j)$ examines the account records $13j$ to determine if the account $A(s)$ exists. If account $A(s)$ is not found, a branch is taken to step S8.

Then computer $X(j)$ examines account $A(s)$ to determine if that account is locked or unlocked. If account $A(s)$ is locked, computer $X(j)$ defers further processing of the control message until the account $A(s)$ subsequently becomes unlocked.

If the account $A(s)$ is unlocked, computer $X(j)$ locks the account, and proceeds by testing the account $A(s)$ to determine if it is active or closed. If the account $A(s)$ is closed, computer $X(j)$ unlocks the account $A(s)$ and branches to step S8.

If account $A(s)$ is open, computer $X(j)$ examines the control message which it received in step S5 to determine if the funds $F(z)$ are to be transferred from the account $A(s)$. If such a transfer is to occur, computer $X(j)$ then tests the account $A(s)$ to determine if the account holds sufficient funds to cover the transfer. If account $A(s)$ holds insufficient funds, then computer $X(j)$ unlocks the account $A(s)$, and branches to step S8.

Also if the control message in step S5 indicates that the funds $F(z)$ are to be transferred from the account $A(s)$, computer $X(j)$ tests the account $A(s)$ to determine if the account $A(r)$ is authorized to receive such a funds transfer. If no such authorization is given in the account $A(s)$, then computer $X(j)$ unlocks the account $A(s)$, and branches to step S8.

If no errors are found in step 6, then computer $X(j)$ performs step S7. There, computer $X(j)$ stores in the history file $14j$, a copy of the control message which it received in step S5; and then computer $X(j)$ branches to step S8.

In step S8, computer $X(j)$ sends a control message to computer $X(i)$ which indicates whether the requested funds transfer is accepted or rejected by computer $X(j)$. When the requested funds transfer is rejected, the control message which is sent identifies the test that failed as explained above.

If the control message which is sent in step S8 indicates that computer $X(j)$ rejects the requested funds transfer, then computer X(i) responds by performing step S9'. This step S9' is also performed by the computer X(i) if after a preset time period, it fails to receive any response to the message that it sent in step S5. In step S9', computer X(i) unlocks the account A(r), and it sends a message to the I/O terminal 15$i$ which informs customer C1 of the problem.

If the control message which is sent in step S8 indicates that computer X(j) accepts the requested funds transfer, then computer X(i) performs step S9. There, computer X(i) sends a control message to computer Y which indicates that both computers X(i) and X(j) authorize computer Y to transfer the funds F(z) in the particular direction between the net accounts for the computers X(i) and X(j).

In response to the control message that is sent in step S9, computer Y performs step S10 which tests the net accounts for computers X(i) and X(j). If all of these tests are satisfied, then computer Y in step S10 also stores a record in the closing records 24 which indicates that all of the computers X(i), X(j) and Y authorize the transfer of funds F(z) in the particular direction between customer accounts A(r) and A(s). By this recording, the transfer of funds F(z) between customer accounts A(r) and A(s) becomes irrevocable.

One of the tests which computer Y performes in step S10 is to examine the net account which will be decreased by the requested funds transfer to determine if the amount of funds being transferred exceeds a maximum limit. If that maximum limit is exceeded, computer Y branches to steps S13$a$ and S13$b$.

Also in step S10, computer Y examines the net account for the one particular computer X(i) or X(j) which will be decreased by the requested funds transfer. If the requested funds transfer will cause that net account to drop below a predetermined negative limit, then computer Y branches to steps S13$a$ and S13$b$.

If all of the tests in step S10 are satisfied, computer Y proceeds by performing steps S11 and S12. In step S11, computer Y adds/subtracts funds F(z) from the net account for computer X(i); and in step S12, computer Y subtracts/adds funds F(z) from the net account for computer X(j). Then, a branch is taken by computer Y to steps S13$a$ and S13$b$.

In step S13$a$, computer Y sends a control message to computer X(i) which either authorizes computer X(i) to transfer the funds F(z) in the particular direction in account A(r) or rejects the funds transfer. This funds transfer is authorized by computer Y only if all tests in step S10 were passed. If computer Y rejects the funds transfer, the control message which is sent identifies the test that failed.

Similarly, in step S13$b$, computer Y sends a control message to computer X(j) which authorizes computer X(j) to transfer the funds F(z) in the particular direction in customer account A(s), or rejects the transaction. Here again, the funds transfer is accepted by computer Y only if all tests in step S10 were passed.

Note that the above steps S10–S13$b$ are performed by computer Y in response to just one control message which is sent in step S9 by computer X(i). But step S9 can be performed by any number of the computers X(1), X(2), ... X(N) simultaneously. Thus, each control message that is sent in step S9 is temporarily held in a queue within computer Y until it can be processed by steps S10–S13$b$.

Computer Y can sequentially process one control message from the queue at a time. Alternatively, computer Y can process multiple control messages from the queue simultaneously so long as none of those control messages require access to the same net account.

In step S14$a$, computer X(i) responds to the control message from computer Y by updating the history of the transaction in the history file 14$i$. Then computer X(i) performs step S15$a$, wherein the funds F(z) are added/subtracted to the customer account A(r) only if the control message in step S13$a$ authorizes the transfer. Then, computer X(i) unlocks the account A(r).

In step S16, computer X(i) sends a message to the I/O terminal 15$i$ which causes that terminal to indicate to the customer C1 that the transfer of funds F(z) is complete, or was rejected. If the funds F(z) were added to the account A(r), any portion of those funds can now be withdrawn or further transferred by the customer C1.

Likewise, in step S14$b$, computer X(j) responds to the control message from computer Y by updating the history of the transaction in the history file 14$j$. Then, in step S15$b$, computer X(j) subtracts/adds the funds F(z) to the customer account A(s) only if the control message in step 13$b$ authorizes the transfer. Then, computer X(j) unlocks the account A(s).

If the funds F(z) were added to the account A(s) in step S15$b$, any portion of those funds can now be withdrawn or further transferred by customer C2. This is indicated in FIG. 2 by step S17.

For each transfer of funds F(z) between any two customer accounts A(r) and A(s) in the computers X(i) and X(j), all of the above steps S1–S17 are repeated. None of these steps involve the movement of any physical item, such as a check, from one location to another. Consequently, the above method of transferring funds is inherently fast; and can be performed within a matter of seconds.

Also, in the above method, the transfer of funds between the customer accounts A(r) and A(s) only occurs after −1) the status of those customer accounts have been fully tested by the computers X(i) and X(j), and 2) the status of the net accounts for the computers x(i) and X(j) have also been fully tested by computer Y. Consequently, the need to reverse a transfer of funds is eliminated; and funds are available for withdrawal, without the risk of a reversal, immediately after the sequence of electronic control messages is completed.

Lastly shown in FIG. 2 is a step S100,000. By that step, computer Y sends electronic messages to the central bank whereby all of the net accounts in computer Y are settled. These messages are sent by computer Y at a rate which is very infrequent relative to the frequency of the message sequence S1–S16; and this is implied by the large gap from step S16 to step S100,000. Preferably, step S100,000 is performed at a rate of less than once every hour.

Figure 3A:
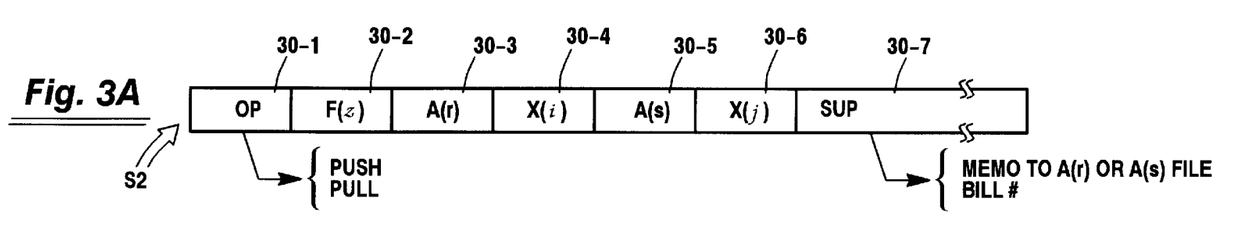
FIGS. 3A–3D show in detail the messages which are transmitted and received when funds are transferred by the steps of FIG. 2.
Figure 3B:
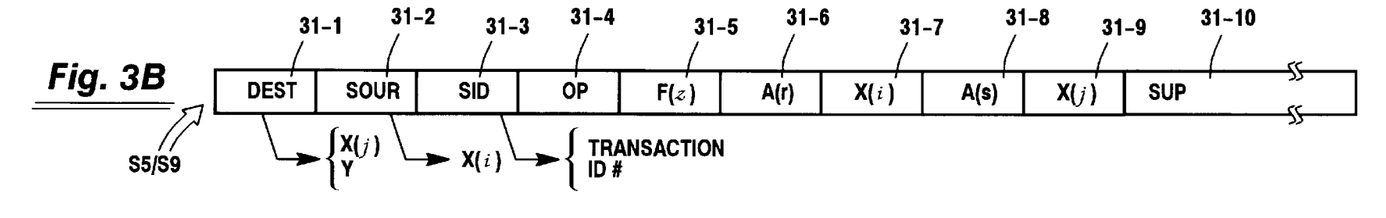
Figures 3C, 3D:
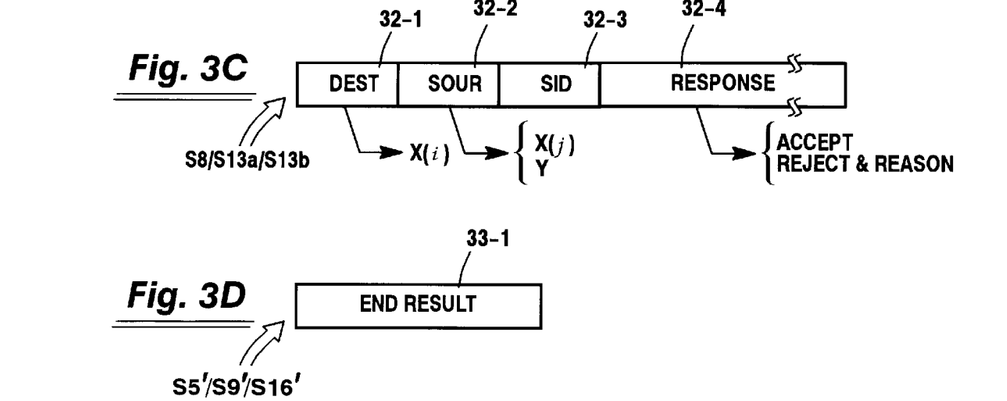

Turning now to FIGS. 3A–3D, they show a format for the input requests and control messages which are sent by the above-described steps. Specifically, FIG. 3A shows the format for the input request which is sent in step S2; FIG. 3B shows the format for the control messages which are sent in steps S5 and S9; FIG. 3C shows the format for the control messages which are sent in steps S8 and S13$a$ and S13$b$; and FIG. 3D shows the format for the control messages which are sent in steps S5', S9' and S16.

In FIG. 3A, the illustrated input request has a total of seven fields 30-1 through 30-7. Field 30-1 specifies an operation which is to be performed on the customer accounts. This operation can be a push operation whereby funds are transferred from customer account A(r) in computer X(i) to customer account A(s) in computer X(j); or this operation can be a pull operation in which funds are transferred from account A(s) in computer X(j) to account A(r) in computer X(i).

Field 30-2 specifies the amount of funds F(z) which are to be transferred. Fields 30-3 and 30-4 respectively identify customer account A(r) and computer X(i). Fields 30-5 and 30-6 respectively identify customer account A(s) and computer X(j). Field 30-7 is a supplemental field in which any additional information can be included as desired. For example, field 30-7 can include a memo which is to be stored in the customer account files A(r) and A(s) if those files are updated by steps S15a and S15b. As another example, the supplemental field can include the identity of a bill which is to be stored in the history files 14i and 14j by the steps S14a and S14b.

In FIG. 3B, the illustrated control message contains a total of ten fields 31-1 thru 31-10. Field 30-1 identifies the destination for the message as being either computer X(j) or computer Y. Field 31-2 identifies the source of the message as being computer X(i). Field 31-3 provides a sequence identification number; and this number is assigned by computer X(i) such that each sequence of control messages which is originated by computer X(i) has a different number. This enables each of the computers X(1) thru X(N) to process multiple input requests concurrently via the steps of FIG. 2 and keep the messages of each sequence separated from the messages of all other concurrent sequences. All of the remaining fields in FIG. 3B are duplicates of corresponding fields in FIG. 3A. For example, the OP field 31-4 of FIG. 3B corresponds to the OP field 30-1 of FIG. 3A; etc.

In FIG. 3C the illustrated control message contains a total of four fields 32-1 thru 32-4. Field 32-1 identifies the destination of the message as computer X(i). Field 32-2 identifies the source of the message as computer X(j) or computer Y. Field 32-3 provides the same sequence identification number as field 31-3 in the control message of FIG. 3B. Field 32-4 provides a response which indicates that the requested funds transfer is either accepted or rejected; and in the case of a rejection, the reason for the rejection is provided.

In FIG. 3D, the illustrated control message contains just a single field 33-1. This field 33-1 provides information for display on the I/O terminal 15i which indicates the end result that was reached by the steps of FIG. 2.

One preferred method of transferring funds electronically in accordance with the present invention has now been described in detail. In addition, however, various changes and modifications can be made to this method without departing from the nature and spirit of the invention; and one such modification will now be described in conjunction with FIG. 4.

Figure 4:
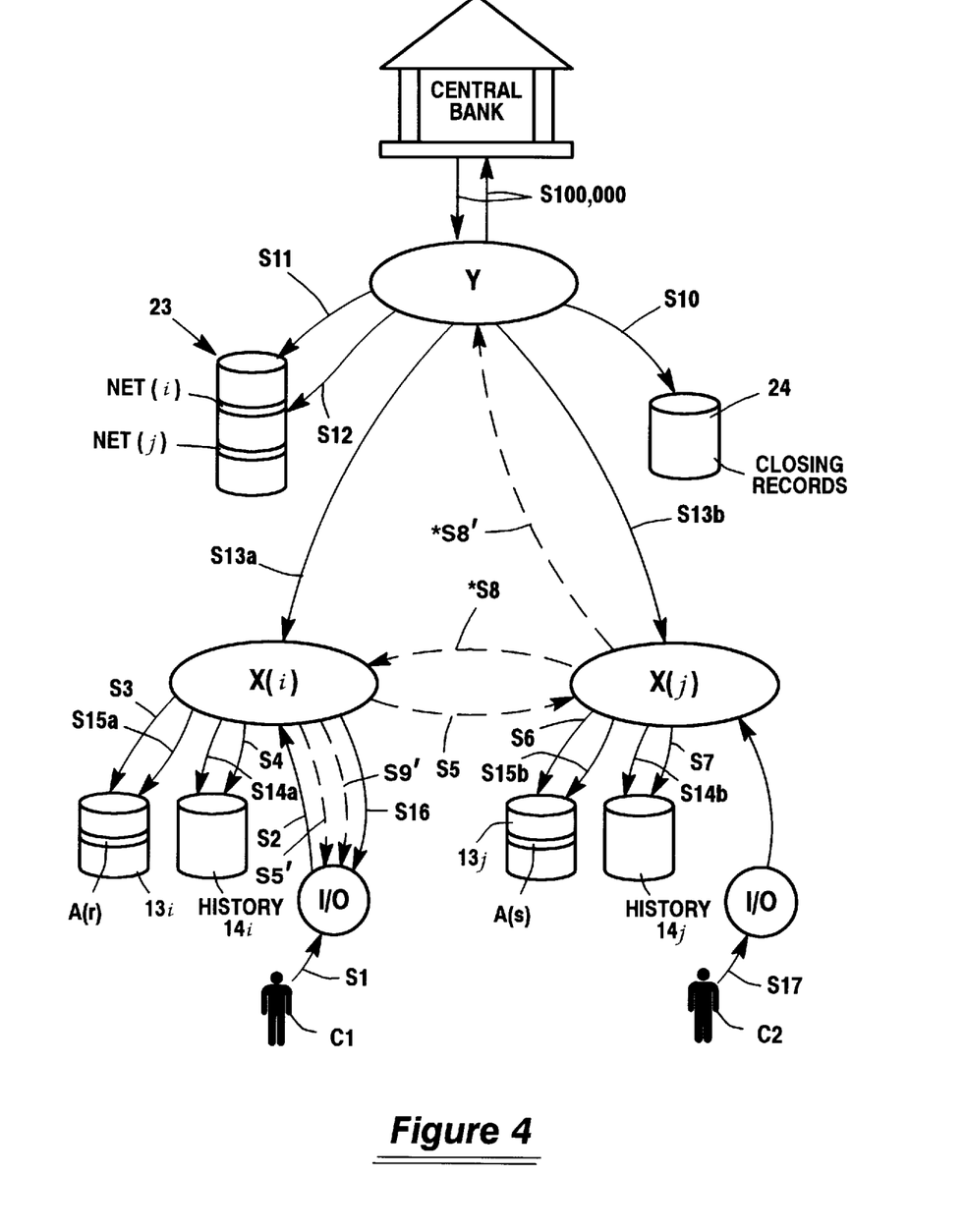
FIG. 4 shows another sequence of steps which are performed by the computers of FIG. 1 and which constitutes a second preferred method of transferring funds electronically according to the present invention.

With the method of FIG. 4, funds are transferred electronically by a sequence of steps S1, S2, S3, S4, S5, S5', S6, S7, *S8, *S8', S9', S10, S11, S12, S13a, S14a, S15a, S16, S13b, S14b, S15b, S17, and S100,000. Each of these steps which is different in FIG. 4 in comparison to the steps of FIG. 2, is preceded by an asterisk. Thus, in FIG. 4, the modified steps are *S8 and *S8'. Also, in FIG. 4, the step S9 that occurs in FIG. 2 is eliminated.

In step *S8, computer X(j) sends a control message to computer X(i) only if at least one of the tests which is performed in step S6 detects an error. This control message which is sent in step *S8 indicates that the requested funds transfer is rejected by computer X(j) and it identifies the problem that was detected in step S6.

If no problem is detected by the tests in step S6, then computer X(j) performs step *S8', wherein a control message is sent to computer Y. This control message indicates that both of the computers X(i) and X(j) authorize computer Y to transfer the funds F(z) in the particular direction between the net accounts for computers X(i) and X(j). When this message of step *S8' is sent, computer Y responds to the message just like it responded to the message of step S9 in FIG. 2.

One particular feature of the FIG. 4 method is that it transfers funds faster than the FIG. 2 method. This increase in speed occurs because a single control message which is sent in step S8' of FIG. 4 replaces the two control messages which are sent in steps S8 and S9 in FIG. 2.

Figure 5:
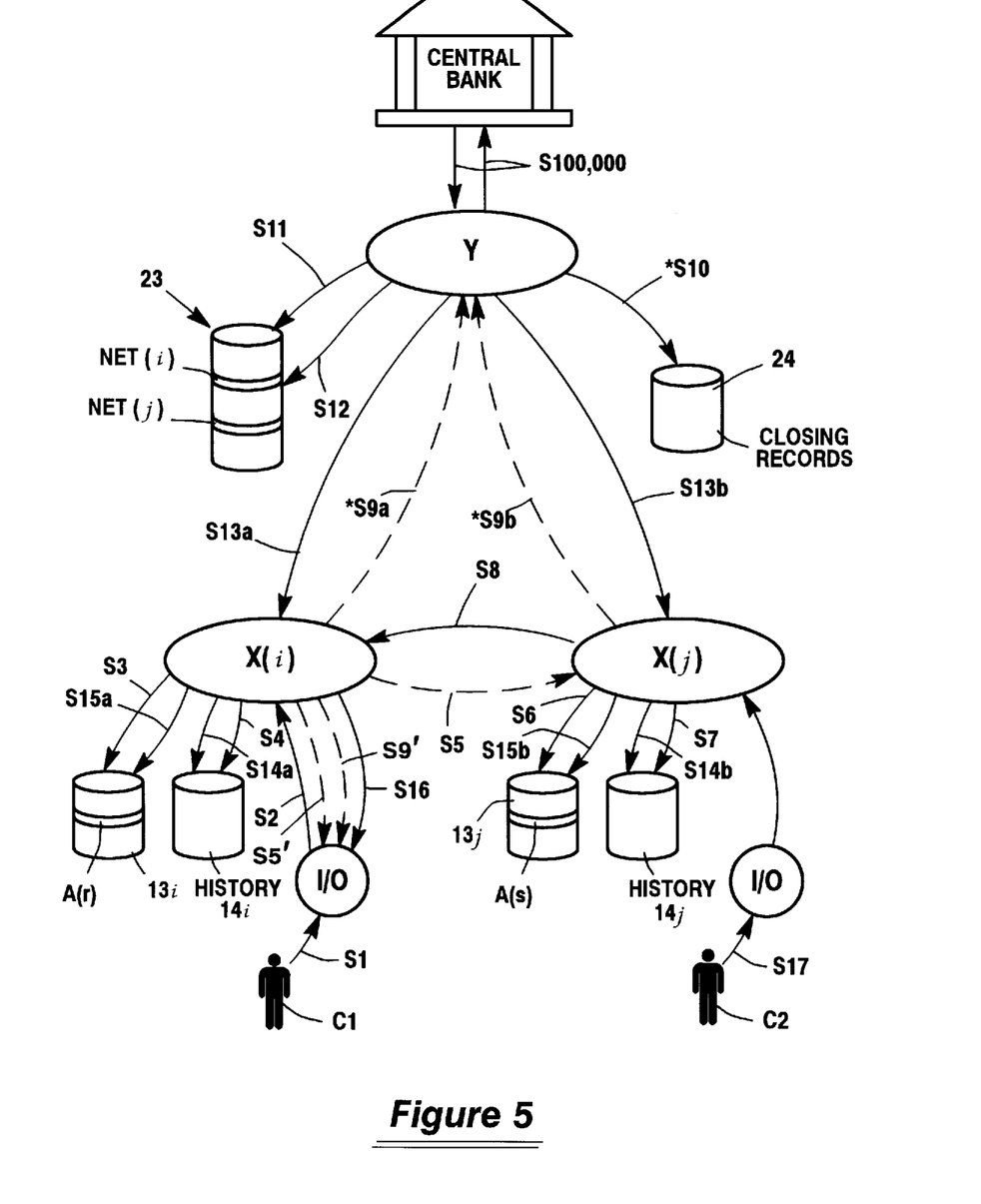
FIG. 5 shows a sequence of steps which are performed by the computers of FIG. 1 and which constitutes a third preferred method of transferring funds electronically according to the present invention.

Next, with reference to FIG. 5, still another method of transferring funds electronically, which is a second modification to the FIG. 2 method, will be described. In FIG. 5, the funds are transferred electronically by the steps S1, S2, S3, S4, S5, S5', S6, S7, S8, S9, S9', *S9, *S10, S11, S12, S13a, S14a, S15a, S16, S13b, S14b, S15b, S17, and S100,000. Here, the modifications over the FIG. 2 method are performed by steps *S9a, *S9b, and *S10.

In step S9a, computer X(i) sends a control message to computer Y only if the control message that is sent in step S8 indicates that computer X(j) accepts the requested funds transfer. This message which is sent in step *S9a tells computer Y that computer X(i) authorizes the transfer of funds F(z) in the particular direction between the net accounts for computers X(i) and X(j). However, this message says nothing about whether or not a transfer of funds is authorized by computer X(j).

In step *S9b, computer X(j) sends a message to computer Y if computer X(j) accepts the requested funds transfer. This message in step *S9b tells computer Y that computer X(j) authorizes the transfer of funds F(z) in the particular direction between the net accounts for computers X(i) and X(j).

In step *S10, computer Y starts a timer when the first authorization message is received from computer X(i) in step *S9a or computer X(j) in step *S9b. If the second authorization message is received within a preset time interval, then computer Y performs all of the tests which are performed in step S10 of the FIG. 2 method. Then, if no problems are detected by the tests, the closing records are updated and steps S11, S12, 13a and S13b are performed. Conversely, if a problem is detected by the tests or the second authorization message is not received within the preset time interval, computer Y notifies computers X(i) and X(j) of the problem by branching the steps S13a and S13b.

One particular feature of the FIG. 5 method is that it provides additional security over the methods of FIGS. 2 and 4. This added security is achieved because it is impossible for just one of the computers X(i) or X(j) to forge a message which authorizes computer Y to transfer funds in the net accounts.

As another modification, each of the methods of FIGS. 2, 4 and 5 can be performed by a wide range of electronic circuitry. For example, the I/O terminals 15i and 15j in FIG. 1 can be any electronic terminal on which a customer can use a keyboard, mouse, touch pen, or voice input to generate and send the input request of FIG. 3A. Similarly, the data processing units 11i, 11j, and 21 in FIG. 1, can include any number of integrated circuit chips which together execute the programmed instructions, either in series or in parallel. Likewise, the communication channel 10 in FIG. 1 can be any electronic channel which passes the control messages of FIGS. 2–5 over copper wire or optical fibre or by wireless transmissions.

As another modification, each customer can have more than one account. With this modification, each customer account as shown in Table I, is modified to include a particular account number with the identification of the account owner. Then, the accounts A(r) and A(s) which are identified in each input request specify both the account owner and the account number. Similarly, any additional items of information can be included in the customer accounts and net accounts over that which is shown in Tables I and II; and, additional tests can be performed on those items, as desired, by the computers X(i), X(j), and Y when the accounts are examined by the steps of FIGS. 2, 4 and 5.

As still another modification, the format of all the messages in FIGS. 3A–3D can be rearranged, condensed, or expanded as desired. For example, to increase the security with which the messages are transmitted, each of the messages in FIGS. 3A–3D can be encrypted. Similarly, a digital signature can be incorporated into each of the messages which identifies the source of the message; and the destination to which the message is sent can reject the message whenever it is unable to verify the validity of the digital signature.

Accordingly, it is to be understood that the present invention is not limited to the details of any one particular method but is defined by the appended claims.

What is claimed is:

1. A method, for use with a group of N computers X(1) thru X(N) which are intercoupled to each other, and to another computer Y, by a communication channel; each computer of said group including multiple customer accounts, and said computer Y including a net account for each computer of said group; said method operating to exchange funds electronically among said customer accounts, and including the steps of:

receiving electronic input requests in said computers X(1) thru X(N), with each input request that is received in computer X(i) specifying that funds F(z) be transferred in a particular direction between a customer account A(r) in computer X(i) and a customer account A(s) in computer X(j)—where indices i and j, r and s, and z respectively identify particular computers, accounts, and funds;

sending on said communication channel, for each input request received by computer X(i), a respective sequence of electronic control messages by which computers X(i) and X(j) both authorize computer Y to transfer funds F(z) between the net accounts for computers X(i) and X(j), and subsequently, computer Y authorizes computers X(i) and X(j) to transfer funds F(z) between the customer accounts A(r) and A(s) respectively; and, transfering said funds F(z) in accounts A(r) and A(s) only after authorization from computer Y is received by computers X(i) and X(j).

2. A method according to claim 1 wherein each sequence of electronic control messages includes a first control message from computer X(i) to computer X(j) which requests that said funds F(z) be transferred in said particular direction between said accounts A(r) and A(s), and a second control message from computer X(j) to computer X(i) which indicates whether the requested funds transfer is accepted or rejected by computer X(j).

3. A method according to claim 2 wherein said second control message indicates that the requested funds transfer is rejected regardless of said particular direction if said account A(s) in computer X(j) has been closed or does not exist.

4. A method according to claim 2 wherein said second control message indicates that the requested funds transfer is rejected if said particular direction is from account A(s) in computer X(j) to account A(r) in computer X(i) and account A(s) has insufficient funds.

5. A method according to claim 2 wherein in response to an acceptance in said second control message, said sequence of electronic control messages further includes a third control message from computer X(i) to said computer Y, which requests that funds F(z) be transferred in said particular direction between the net accounts for computers X(i) and X(j), and a fourth control message that is from said computer Y to at least one of said computers X(i) and X(s), which indicates that said funds F(z) have been transferred between said net accounts for computers X(i) and X(j).

6. A method according to claim 5 wherein in response to said fourth control message, computers X(i) and X(j) transfer said funds F(z) between said accounts A(r) and A(s).

7. A method according to claim 5 wherein prior to sending said fourth control message, computer Y stores a record which verifies that a transfer of said funds F(z) in said particular direction between accounts A(r) in computer X(i) and account A(s) in computer X(j) was authorized by computers X(i) and X(j) via X(i).

8. A method according to claim 1 wherein each sequence of electronic control messages includes a first control message from computer X(i) to computer X(j) which requests that said funds F(z) be transferred in said particular direction between said accounts A(r) and A(s), and a second control message from computer X(j) to computer Y or computer X(i) which indicates respectively that the requested funds transfer is accepted or rejected by computer X(j).

9. A method according to claim 8 wherein said second control message is to computer X(i) and indicates that the requested funds transfer is rejected regardless of said particular direction if said account A(s) in computer X(j) has been closed or does not exist.

10. A method according to claim 8 wherein said second control message is to computer X(i) and indicates that the requested funds transfer is rejected if said particular direction is from account A(s) in computer X(j) to account A(r) in computer X(i) and account A(s) has insufficient funds.

11. A method according to claim 8 wherein in response to an acceptance in said second control message to computer Y, said sequence of electronic control messages further includes a third control message that is from said computer Y to at least one of said computers X(i) and X(j), which indicates that said funds F(z) have been transferred between said net accounts for computers X(i) and X(j).

12. A method according to claim 11 wherein in response to said third control message, computers X(i) and X(j) transfer said funds F(z) between said accounts A(r) and A(s).

13. A method according to claim 11 wherein prior to sending said third control message, computer Y stores a record which verifies that a transfer of said funds F(z) in said particular direction between accounts A(r) in computer X(i) and account A(s) in computer X(j) was authorized by computers X(j) and X(i) via X(j).

14. A method according to claim 1 wherein each sequence of electronic control messages includes a first control message from computer X(i) to computer X(j) which requests that said funds F(z) be transferred in said particular direction between said accounts A(r) and A(s), a second control message from computer X(j) to computer X(i) which indicates whether the requested funds transfer is accepted or rejected by computer X(j), and a third control message from computer X(j) to computer Y if the requested funds transfer is accepted by computer X(j).

15. A method according to claim 14 wherein said second control message indicates that the requested funds transfer is rejected regardless of said particular direction if said account A(s) in computer X(j) has been closed or does not exist.

16. A method according to claim 14 wherein said second control message indicates that the requested funds transfer is rejected if said particular direction is from account A(s) in computer X(j) to account A(r) in computer X(i) and account A(s) has insufficient funds.

17. A method according to claim 14 wherein in response to an acceptance in said second control message, said sequence of electronic control messages further includes a fourth control message from computer X(i) to said computer Y, which requests that funds F(z) be transferred in said particular direction between the net accounts for computers X(i) and X(j), and a fifth control message from said computer Y to at least one of said computers X(i) and X(j), which indicates that in response to said third and fourth control messages, said funds F(z) have been transferred between said net accounts for computers X(i) and X(j).

18. A method according to claim 17 wherein in response to said fifth control message, computers X(i) and X(j) transfer said funds F(z) between said accounts A(r) and A(s).

19. A method according to claim 17 wherein prior to sending said fifth control message, computer Y stores a record which verifies that a transfer of said funds F(z) in said particular direction between accounts A(r) in computer X(i) and account A(s) in computer X(j) was authorized by computers directly by X(i) and X(j).

20. A method according to claim 1 wherein in each computer X(i), hundreds of said input requests are received; and in response thereto, a corresponding number of said control message sequences occur on said communication channel, before said settling step is performed.

21. A method according to claim 1 wherein before said settling step, one subset of said control message sequences add funds to a particular customer account and another subset of said control message sequences subtract funds to that said particular account.

22. A method according to claim 1 wherein said settling step is performed at a rate of less than once every hour whereas each sequence of control messages occurs in less than five minutes.

23. A method according to claim 1 wherein said particular direction is selectable, by each input request, to be from account A(r) to account A(s) or vice-versa.

24. A method according to claim 1 wherein said particular direction is predetermined to be from account A(s) to account A(r).

25. A method according to claim 1 wherein said particular direction is predetermined to be from account A(r) to account A(s).

* * * * *